United States Patent [19]

Nakashima et al.

[11] Patent Number: 5,224,002
[45] Date of Patent: Jun. 29, 1993

[54] THIN-FILM MAGNETIC HEAD DEVICE

[75] Inventors: Keishi Nakashima; Tsuyoshi Tosho, both of Nagaoka, Japan

[73] Assignee: Alps Electric Co., Ltd., Tokyo, Japan

[21] Appl. No.: 809,823

[22] Filed: Dec. 17, 1991

[30] Foreign Application Priority Data

Dec. 28, 1990 [JP] Japan .................. 2-416892

[51] Int. Cl.⁵ .................... G11B 5/127; G11B 5/147
[52] U.S. Cl. ......................... 360/126; 360/125
[58] Field of Search ............... 360/126, 125, 120, 119; 29/603

[56] References Cited

U.S. PATENT DOCUMENTS

| | | | |
|---|---|---|---|
| 4,780,779 | 10/1988 | Pisharody et al. | 360/120 |
| 4,780,781 | 10/1988 | Sano et al. | 360/125 X |
| 5,025,342 | 6/1991 | Nagata et al. | 360/126 |
| 5,126,907 | 6/1992 | Hamakawa et al. | 360/126 |
| 5,157,570 | 10/1992 | Shukovsky et al. | 360/126 |

*Primary Examiner*—John H. Wolff
*Attorney, Agent, or Firm*—Guy W. Shoup; Patrick T. Bever

[57] ABSTRACT

An object of the present invention is to provide a thin-film magnetic head device capable of magnetically writing magnetic signals into a magnetic recording medium having a high coercive force and reading the same therefrom. At least one of upper and lower magnetic layers is composed of a main magnetic layer and a sub magnetic layer. The sub magnetic layer has a saturation magnetic flux density of 1.5T or greater, a magnetic permeability of 1000 or less and an anisotropic magnetic field of 10 Oe or greater. The thickness of the sub magnetic layer should preferably be 0.5 μm or less. According to the present invention, the sub magnetic layer can obtain a high saturation magnetic flux density and the main magnetic layer can attain a high magnetic permeability. With a thickness of 0.5 μm or less, the sub magnetic layer can obtain a high saturation magnetic flux density without reducing the magnetic permeability.

2 Claims, 2 Drawing Sheets

THIN-FILM MAGNETIC HEAD DEVICE

BACKGROUND OF THE INVENTION

1. Field of the Invention

The present invention relates to a thin-film magnetic head device having a magnetic structure of such a type that a magnetic gap layer is interposed between upper and lower magnetic layers at a surface of the device facing a recording medium.

2. Description of the Related Art

There have recently been made approaches for subjecting a magnetic head device employed in a magnetic disc apparatus to a high density to meet the performance of a recording medium such as a magnetic disc and for activating the magnetic head device with high efficiency. The magnetic head device has progressively been rendered small in size and greatly improved in view of its accuracy. In order to meet the demand referred to above, there have been proposed various kinds of small thin-film magnetic head devices of a type wherein high-density magnetic recording can be carried out in a state in which a magnetic field distribution of the leading end of a magnetic pole contributing to magnetic recording is sharp. These thin-film magnetic head devices have already been put to practical use.

FIG. 5 shows one example of an arrangement of one of such thin-film magnetic head devices. A thin-film magnetic head device A shown in FIG. 5 is structurally formed in the following manner. Described specifically, a lower magnetic layer 14 and a gap layer 10 are formed on a substrate 24 through a lower insulating layer 26. There is also formed on a combination of the lower magnetic layer 14 and the gap layer 10, conductive coils 22 enveloped by an interlayer insulating layer 20. In addition, an upper magnetic layer 12 and a covering layer 16 are formed on a combination of the lower magnetic layer 14, the gap layer 10 and the conductive coils 22. Now, each of the upper and lower magnetic layers 12, 14 is normally made of a permalloy.

The thin-film magnetic head device A having this type of structure suffers one serious disadvantage under the present conditions. Described specifically, the use of the upper and lower magnetic layers 12, 14 each made of the permalloy makes the device A inferior in its recording characteristic as compared with other types of magnetic head devices except for a thin-film magnetic head device using a magnetic member having a magnetic characteristic superior to that of the permalloy. The process of writing magnetic information into a magnetic recording medium having a high coercive force is rendered difficult in particular. Thus, if each of the upper and lower magnetic layers 12, 14 is formed of a magnetic material having a magnetic characteristic superior to that of the permalloy which has widely been used, then the recording characteristic can be improved. This has been definitely shown by various simulations and experiments.

When the upper and lower magnetic layers 12, 14 are composed of known thin films (e.g., a thin film of an amorphous alloy, a thin film of an Fe-N alloy, etc.) each having a high magnetic flux density and a high magnetic permeability, these films are, however, unstable to heat and nonresistant to corrosion, thereby causing the problem that they are impractical in use. On the other hand, when a magnetic material stable to heat, which has adjusted its components and its manufacturing conditions, are used to produce a magnetic material having a high magnetic flux density, the magnetic permeability of such a magnetic material cannot be rendered high.

SUMMARY OF THE INVENTION

With the foregoing problems in view, it is therefore an object of the present invention to provide a thin-film magnetic head device capable of writing magnetic information into a magnetic recording medium having a coercive force greater than a conventional magnetic recording medium treated by a conventional thin-film magnetic head device and reading the same therefrom.

According to the present invention as defined in claim 1, there is provided a thin-film magnetic head device having a substrate on which are successively formed in a stacked state a lower insulating layer, a lower magnetic layer, a gap layer, conductive coils enveloped by an interlayer insulating layer, an upper magnetic layer and a covering layer, the improvement wherein at least one of the upper and lower magnetic layers is composed of a main magnetic layer and a sub magnetic layer having a magnetic flux density greater than that of the main magnetic layer and a magnetic permeability lower than that of the main magnetic layer, and the values of saturation magnetic flux density, magnetic permeability and anisotropic magnetic field of the sub magnetic layer satisfy the following equations:

saturation magnetic flux density (Bs) $\geq 1.5T$ magnetic permeability $(\mu) \leq 1000$ anisotropic magnetic field (Hk) $\geq 10$ Oe According to the present invention as defined in claim 2, there is provided a thin-film magnetic head device wherein the thickness of the sub magnetic layer is 0.5 μm or less.

According to the thin-film magnetic head device of the present invention, the sub magnetic layer having a high saturation magnetic flux density and a low magnetic permeability and the main magnetic layer having a low saturation magnetic flux density and a high magnetic permeability can magnetically record signals in combination with each other. Therefore, the entire magnetic layer composed of the main and sub magnetic layers can magnetically record signals therein and read out the same therefrom with a high saturation magnetic flux density and a high magnetic permeability.

The above and other objects, features and advantages of the present invention will become apparent from the following description and the appended claims, taken in conjunction with the accompanying drawings in which preferred embodiments of the present invention are shown by way of illustrative example.

DESCRIPTION OF THE PREFERRED EMBODIMENTS

Figure 1:
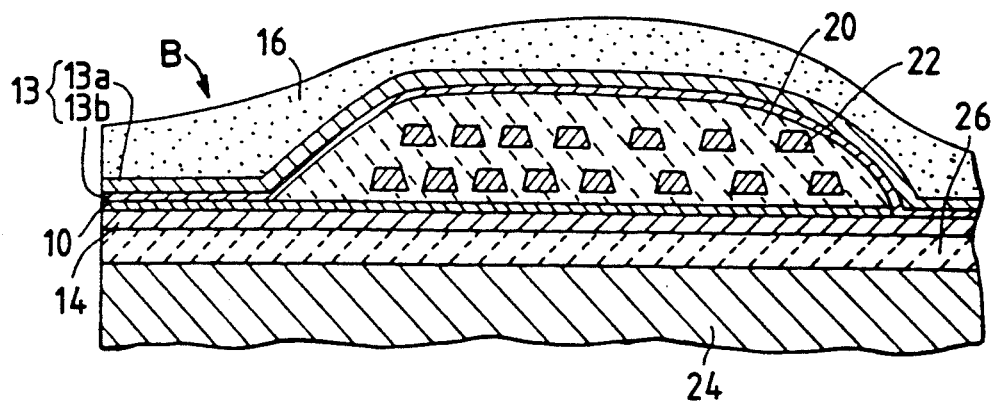
FIG. 1 is a cross-sectional view of a first embodiment of the present invention.
Figure 5:
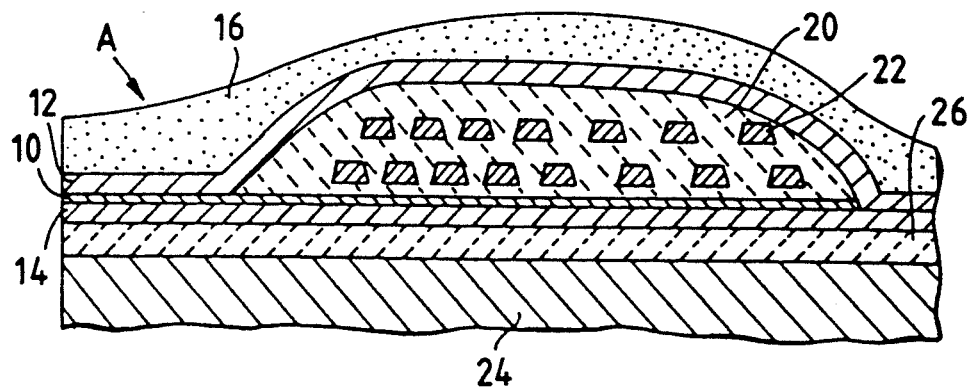
FIG. 5 is a cross-sectional view showing one example of a magnetic structure of a conventional thin-film magnetic head device.

FIG. 1 shows a magnetic structure of a thin-film magnetic head device B as a first embodiment of the present invention. The thin-film magnetic head device B is structurally identical to the conventional thin-film magnetic head device shown in FIG. 5. The thin-film magnetic head device B has a substrate 24 on which are successively formed in a stacked state a lower insulating layer 26, a lower magnetic layer 14, a gap layer 10, conductive coils 22 enveloped by an interlayer insulating layer 20, an upper magnetic layer 13 and a covering layer 16.

The thin-film magnetic head device B differs from the conventional thin-film magnetic head device A in that the upper magnetic layer 13 comprises a main magnetic layer 13a and a sub magnetic layer 13b.

The main magnetic layer 13a is made of a magnetic material (e.g., permalloy of an Fe-Ni alloy) which is substantially the same as that constitutes an upper magnetic layer 12 employed in the conventional thin-film magnetic head device A. The thickness of the main magnetic layer 13a is substantially the same as that of a magnetic layer employed in a known thin-film magnetic head device. Described specifically, the thickness of the main magnetic layer 13a ranges from about 1 $\mu$m to several $\mu$m. Thus, the main magnetic layer 13a has a saturation magnetic flux density and a magnetic permeability which are substantially the same as those of the magnetic layer employed in the conventional thin-film magnetic head device. As the magnetic material for forming the main magnetic layer 13a, a sendust of an Fe-Al-Si alloy, etc. may be used.

On the other hand, the sub magnetic layer 13b is made of a magnetic material which has a saturation magnetic flux density greater than that of the permalloy but has a magnetic permeability lower than that of the permalloy. It is desired that the thickness "t" of the sub magnetic layer 13a is subjected to the following ranges, i.e., $0 < t < 0.5 \mu m$. Incidentally, as the magnetic material of the sub magnetic layer 13b, there is employed a magnetic material such as a thin film of a Co-Ni-Fe alloy, which has a saturation magnetic flux , density greater than that of the permalloy of the main magnetic layer 13a and a magnetic permeability smaller than that of the conventional permalloy.

The thin-film magnetic head device B constructed as described above is activated to write a magnetic signal into a magnetic recording medium such as a magnetic disc and read the same therefrom in a manner similar to the conventional thin-film magnetic head device A.

Since the saturation magnetic flux density of the sub magnetic layer 13b is high at this time, the thin-film magnetic head device B can be applied even to a magnetic recording medium having a greater coercive force. In addition, the main magnetic layer 13a has a higher magnetic permeability whereas the sub magnetic layer 13b has a magnetic permeability lower than that of the main magnetic layer 13a. However, the thickness of the sub magnetic layer 13b is thinner than that of the main magnetic layer 13a. Described specifically, the thickness of the sub magnetic layer 13b is 0.5 $\mu$m or less. Therefore, the degree of reduction in the magnetic permeability is small so that the entire magnetic permeability of the magnetic layer 13 is hardly reduced.

Figure 2:
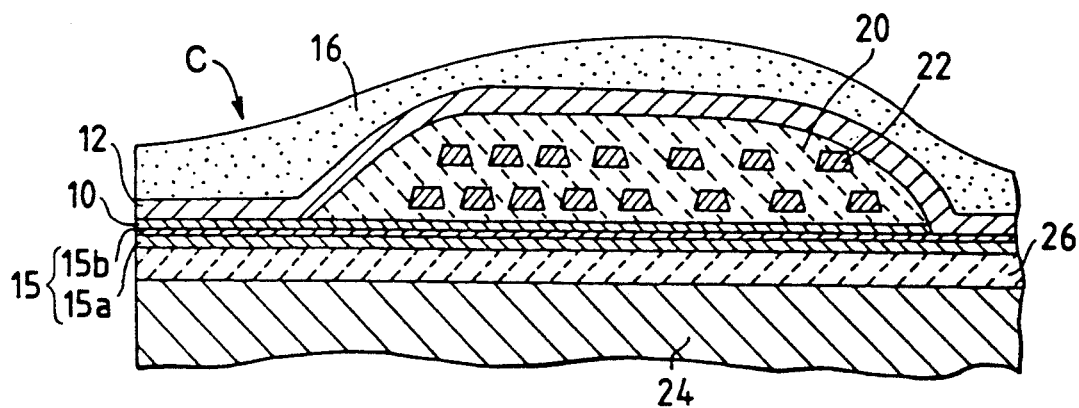
FIG. 2 is a cross-sectional view of a second embodiment of the present invention.

FIG. 2 shows a thin-film magnetic head device C as a second embodiment of the present invention. The thin-film magnetic head device C differs from the conventional thin-film magnetic head device A in that a lower magnetic layer 15 comprises a main magnetic layer 15a and a sub magnetic layer 15b. Other elements of structure employed in the thin-film magnetic head device C are identical to those in the conventional thin-film magnetic head device A.

The main magnetic layer 15a of the thin-film magnetic head device C is made of a magnetic material which is substantially identical to that of the main magnetic layer 13a employed in the above-described first embodiment, whereas the sub magnetic layer 15b is made of a magnetic material substantially identical to that of the sub magnetic layer 13b employed in the first embodiment. The thickness of each of the main and sub magnetic layers 15a, 15b is identical to that of each of the main and sub magnetic layers 13a, 13b employed in the first embodiment.

The thin-film magnetic head device C illustrated as the second embodiment can bring about the same advantageous effects as those obtained by the thin-film magnetic head device B of the first embodiment.

Incidentally, a description has been made in the case in which the upper magnetic layer in the first embodiment and the lower magnetic layer in the second embodiment are respectively composed of the main and sub magnetic layers. It is, however, needless to say that the upper and lower magnetic layers in each of the first and second embodiments may respectively be formed of the main and sub magnetic layers.

Then, the magnetic characteristics of the thin-film magnetic head devices each having the structure shown in each of FIGS. 1 and 2 were measured by changing the thickness of each of the main and sub magnetic layers in the range of 0 to 2 $\mu$m.

Figure 3:
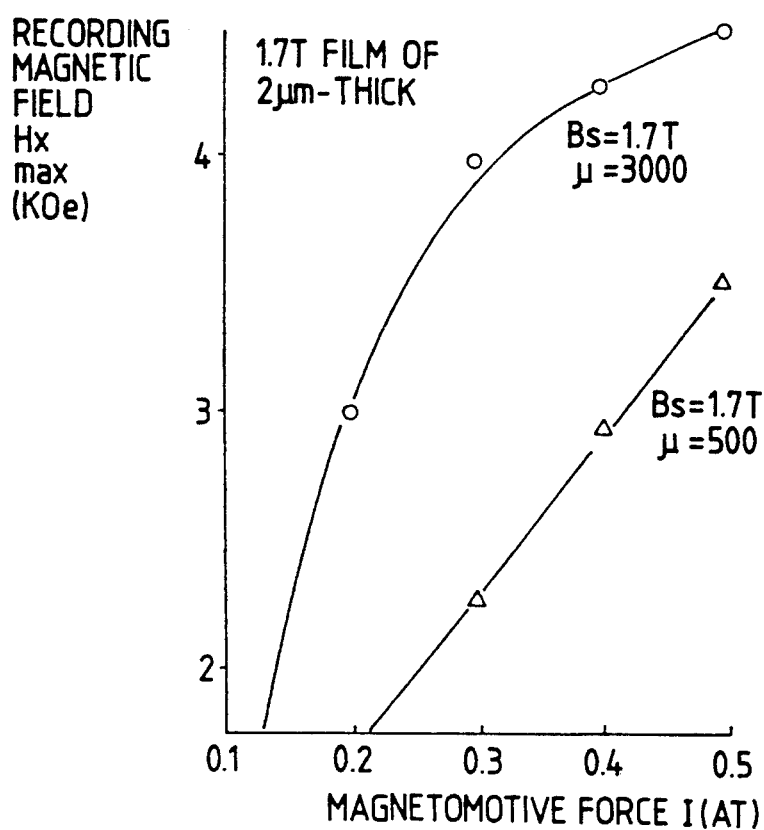
FIG. 3 is a view for describing the relationship between magnetomotive forces and anisotropic magnetic fields produced by a thin-film magnetic head device having a magnetic layer composed of only a sub magnetic layer employed in the present invention.

FIG. 3 shows the relationships between recording magnetic fields and magnetomotive forces of a thin-film magnetic head device with a magnetic layer (film) having a saturation magnetic flux density (Bs) of a 1.7T(tesla) and a magnetic permeability ($\mu$) of 3000, and between recording magnetic fields and magnetomotive forces of a thin-film magnetic head device with a magnetic layer having the same saturation magnetic flux density as described above and a magnetic permeability of 500.

As will be understood from the result shown in FIG. 3, when the magnetic permeability is low, the magnetic flux density is not saturated at 0.5 AT, and the magnitude of the magnetic field shows a low value.

Figure 4:
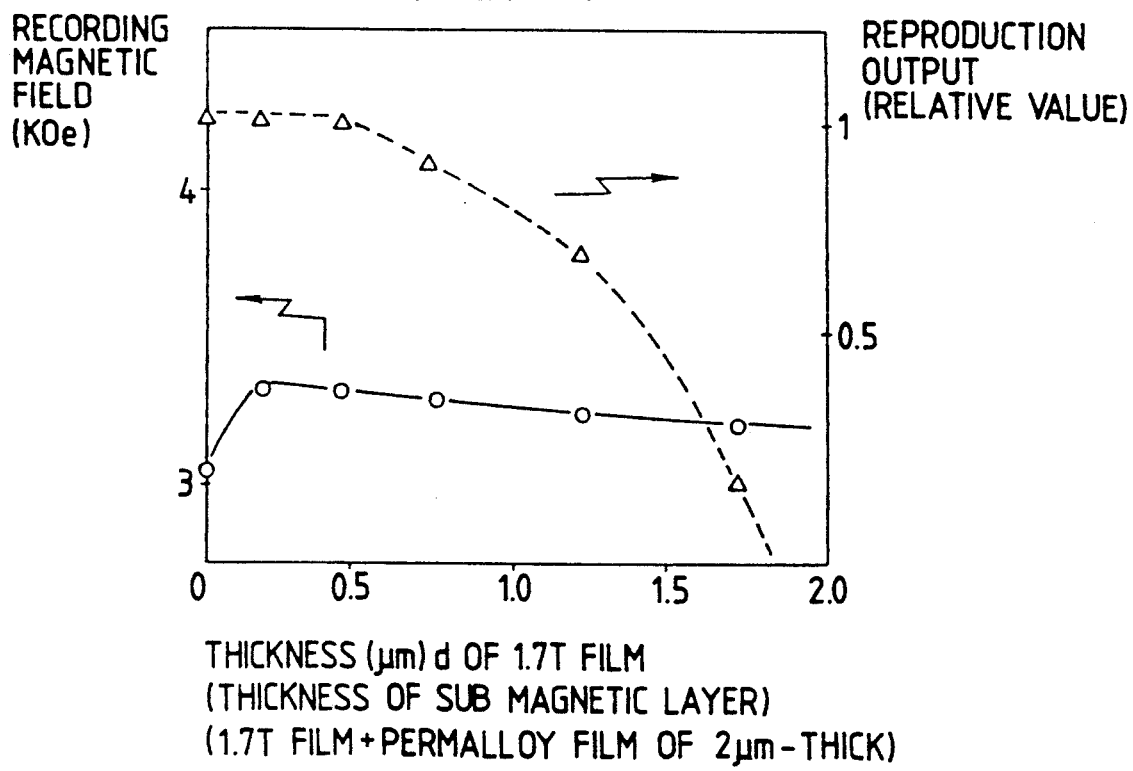
FIG. 4 is a view for describing the relationship among the thickness of the magnetic layer employed in the thin-film magnetic head device employed in the present invention, the magnetic field recorded in the magnetic layer and the output reproduced from the magnetic layer.

FIG. 4 shows the relationship among the thickness of a magnetic layer in a thin-film magnetic head device, the magnetic field recorded in the magnetic layer, and the output reproduced from the magnetic layer at the time that the thickness of the magnetic layer having the saturation magnetic flux density of 1.7T referred to above is increased or decreased.

As will be understood from FIG. 4, an increase in the recording magnetic field is shown in the range at which the film thickness of the sub magnetic layer is relatively thin (0.5 $\mu$m or less). When the film thickness of the sub magnetic layer exceeds that range, the recording magnetic field is not increased due to a bad influence (a tendency of the magnetic flux density being hard to saturate) of a low magnetic permeability (see the result shown in FIG. 3). When a low permeability range becomes large, the reproduction output is rendered low in level, with the result that the range at which the film thickness of the sub magnetic layer is thick is impractical.

According to the present invention, as has been described above, a magnetic layer basically comprises a sub magnetic layer having a high magnetic flux density and a low magnetic permeability, and a main magnetic layer made of a known permalloy or the like, which has a high magnetic permeability. Therefore, magnetic recording and reproduction of signals can be carried out with a high saturation magnetic flux density and a high magnetic permeability by the entire magnetic layer composed of a combination of the main magnetic layer and the sub magnetic layer.

If the thickness of the sub magnetic layer is 0.5 μm or less, a bad influence of the sub magnetic layer having a low magnetic permeability can be avoided while the recording magnetic field is being increased, and high-density recording of signals can be conducted without any reduction in the reproduction output.

Having now fully described the invention, it will be apparent to those skilled in the art that many changes and modifications can be made without departing from the spirit or scope of the invention as set forth herein.

What is claimed is:

1. In a thin-film magnetic head device having a substrate on which are successively formed in a stacked state a lower insulating layer, a lower magnetic layer, a gap layer, conductive coils enveloped by an interlayer insulating layer, an upper magnetic layer and a covering layer, the improvement wherein at least one of said upper and lower magnetic layers is composed of a main magnetic layer and a sub magnetic layer having a magnetic flux density greater than that of said main magnetic layer and a magnetic permeability lower than that of said main magnetic layer, and the values of saturation magnetic flux density, magnetic permeability and anisotropic magnetic field of said sub magnetic layer satisfy the following equations:

saturation magnetic flux density (Bs) $\geq 1.5T$ magnetic permeability ($\mu$) $\leq 1000$ anisotropic magnetic field (Hk) 24 10 Oe.

2. A thin-film magnetic head device according to claim 1, wherein the thickness of said sub magnetic layer is 0.5 μm or less.

* * * * *